US012665470B2

(12) United States Patent
Tschida et al.

(10) Patent No.: US 12,665,470 B2
(45) Date of Patent: Jun. 23, 2026

(54) MACHINE COOLING SYSTEM

(71) Applicant: Wright Electric Inc., Ballston Spa, NY (US)

(72) Inventors: Colin Tschida, Ballston Spa, NY (US); Piotr Kurowski, Ballston Spa, NY (US); Earl Fairall, Ballston Spa, NY (US); Patrick Biel, Ballston Spa, NY (US)

(73) Assignee: Wright Electric Inc.

( * ) Notice: Subject to any disclaimer, the term of this patent is extended or adjusted under 35 U.S.C. 154(b) by 239 days.

(21) Appl. No.: 18/235,715

(22) Filed: Aug. 18, 2023

(65) Prior Publication Data

US 2024/0154499 A1    May 9, 2024

Related U.S. Application Data

(60) Provisional application No. 63/417,191, filed on Oct. 18, 2022.

(51) Int. Cl.
H02K 9/19        (2006.01)
B64D 33/08      (2006.01)
H02K 11/33      (2016.01)

(52) U.S. Cl.
CPC .............. H02K 9/19 (2013.01); B64D 33/08 (2013.01); H02K 11/33 (2016.01)

(58) Field of Classification Search
CPC .......... H02K 9/19; H02K 11/33; H02K 9/193; B64D 33/08
USPC ......................................................... 165/51
See application file for complete search history.

(56) References Cited

U.S. PATENT DOCUMENTS

| | | | | |
|---|---|---|---|---|
| 3,659,125 A | * | 4/1972 | Basel | H02K 9/19 |
| | | | | 239/225.1 |
| 5,491,370 A | * | 2/1996 | Schneider | H02K 11/33 |
| | | | | 310/68 R |
| 6,879,069 B1 | * | 4/2005 | Weidman | H02K 9/197 |
| | | | | 310/61 |

(Continued)

FOREIGN PATENT DOCUMENTS

| | | | | | |
|---|---|---|---|---|---|
| CA | 3070360 A1 | * | 1/2019 | | H02K 11/33 |
| CN | 110999041 A | * | 4/2020 | | H02K 11/33 |

(Continued)

OTHER PUBLICATIONS

International Search Report and Written Opinion for International Application No. PCT/US2023/030625 mailed Dec. 19, 2023 (11 pages).

*Primary Examiner* — Jon T. Schermerhorn, Jr.
(74) *Attorney, Agent, or Firm* — Nutter McClennen & Fish LLP

(57)            ABSTRACT

An aircraft has an electric motor to generate thrust and a power electronic module to provide power to the electric motor. The power electronic (PE) module has an output power to fluidly couple the electric motor and the PE module. The aircraft has an alternating current (AC) lead to electrically couple the PE module and the electric motor by way of the output port. The AC lead is submerged within the output port by a liquid coolant. The aircraft also has a cooling system including a heat extractor. The cooling system passes the liquid coolant through the PE module including the output port, then through the electric motor, and then through the heat extractor.

20 Claims, 5 Drawing Sheets

(56) References Cited

U.S. PATENT DOCUMENTS

| | | | | |
|---|---|---|---|---|
| 7,009,317 | B2 * | 3/2006 | Cronin | H02K 5/203 |
| | | | | 310/52 |
| 9,306,433 | B2 * | 4/2016 | Sten | H02K 9/193 |
| 9,762,106 | B2 * | 9/2017 | Gauthier | H02K 1/32 |
| 10,348,161 | B2 * | 7/2019 | Mackowiak | B60K 6/26 |
| 10,931,170 | B2 * | 2/2021 | Parlante | B64D 37/32 |
| 11,848,631 | B2 * | 12/2023 | Yoon | H02P 23/28 |
| 12,227,300 | B2 * | 2/2025 | Graves | B60L 15/38 |
| 12,312,091 | B2 * | 5/2025 | Graves | B64D 27/24 |
| 12,486,022 | B2 * | 12/2025 | Graves | B64C 11/02 |
| 2008/0168796 | A1 * | 7/2008 | Masoudipour | H02K 9/197 |
| | | | | 62/505 |
| 2010/0127583 | A1 * | 5/2010 | Yoshida | H02K 11/05 |
| | | | | 310/59 |
| 2016/0380515 | A1 * | 12/2016 | Mackowiak | H02K 5/20 |
| | | | | 310/54 |
| 2021/0104935 | A1 | 4/2021 | Morrison | |
| 2021/0254705 | A1 * | 8/2021 | Olson | F16H 57/0471 |

FOREIGN PATENT DOCUMENTS

| | | | | |
|---|---|---|---|---|
| NL | 2019302 | B1 * | 2/2019 | H02K 11/33 |
| WO | WO-2019017787 | A1 * | 1/2019 | H02K 11/33 |

* cited by examiner

501 — Operate Aircraft Propulsion System

503 — Pass Liquid Coolant to Motor

505 — Pass Liquid Coolant to Extractor

507 — Extract Heat

509 — Pass Liquid Coolant to PE Module

500

MACHINE COOLING SYSTEM

PRIORITY

This patent application claims priority from provisional U.S. patent application No. 63/417,191, filed Oct. 18, 2022, entitled, "PERMANENT MAGNET MOTOR OIL COOLING SYSTEMS AND METHODS," and naming Colin Tschida et al. as inventors, the disclosure of which is incorporated herein, in its entirety, by reference.

GOVERNMENT RIGHTS

This invention was made with government support under DE-AR0001357 awarded by the U.S. Department of Energy. The government has certain rights in the invention.

FIELD

Illustrative embodiments generally relate to liquid cooling used in aircraft propulsion.

BACKGROUND

Power electronics may be used to provide power to an electric motor, causing the driveshaft of the electric motor to rotate. A load, such as a fan, may be attached to the driveshaft. Where the electric motor is used in aircraft propulsion, the rotation of the driveshaft and the fan generates thrust to move the aircraft. As the power electronics and the electric motor operate, they generate a byproduct of heat which must be regulated to prevent overheating. Power-dense motors and power electronics may need to dissipate heat in a small volume requiring aggressive cooling. In addition, while flying through the air, if either the motor or the electronics fail, the aircraft will be forced into an emergency situation.

SUMMARY

In accordance with one embodiment of the invention, an aircraft has an electric motor to generate thrust and a power electronic (PE) module to provide power to the electric motor. The PE module has an output port to fluidly couple the electric motor and the PE module. The aircraft has an alternating current (AC) lead to electrically couple the PE module and the electric motor by way of the output port. The aircraft also has a cooling system including a heat extractor. The cooling system passes a liquid coolant through the PE module including the output port, then through the electric motor, and then through the heat extractor.

The PE module may be mechanically coupled to the electric motor. The PE module may have a cold plate thermally coupled to at least one of the AC lead or electronic components of the PE module.

In some embodiments, the PE module may have a PE enclosure and the electric motor may have an electric motor enclosure. The AC lead may be submerged within the output port by the liquid coolant the cooling system floods the PE enclosure and the electric motor enclosure.

In some embodiments, the aircraft has a driveshaft and a plurality of PE modules. The PE modules form a ring arrangement such that the driveshaft and ring arrangement are concentric.

In some embodiments, the aircraft has PE modules forming a PE ring arrangement, an intake manifold to be coupled to a coolant input port of each of the plurality of PE modules, and an output manifold configured to be coupled to the electric motor. The PE ring arrangement, the intake manifold, and the output manifold may be arranged concentrically.

In some embodiments, the cooling system has a plurality of parallel cooling paths between the electric motor and the intake manifold formed by the plurality of PE modules.

In accordance with another embodiment of the invention, a method for cooling an aircraft propulsion system operates the aircraft propulsion system including an electric motor, a power electronic (PE) module, an alternating current (AC) lead, and a cooling system including a heat extractor. The electric motor is fluidly coupled to the heat extractor and the PE module. The method passes liquid coolant from the PE module to the electric motor by way of a coolant channel. The AC lead is electrically coupled between the electric motor and the PE module. The AC lead is positioned within the coolant channel. The method passes the liquid coolant from the electric motor to the heat extractor. The method extracts heat from the liquid coolant using the heat extractor. The method passes the liquid coolant from the heat extractor to the PE module.

In some embodiments, the PE module includes a PE enclosure and the electric motor includes an electric motor enclosure. Passing the liquid coolant from the PE module to the electric motor may include flooding the electric motor enclosure and the cooling channel. Passing the liquid coolant from the heat extractor to the PE module may include flooding the PE module.

In some embodiments, the cooling system may include an intake manifold and an output manifold. Passing the liquid coolant from the electric motor to the heat extractor may include passing the liquid coolant through the output manifold. Passing the liquid coolant from the heat extractor to the PE module may include passing the liquid coolant through the intake manifold.

In some embodiments, the method arranges the intake manifold and the output manifold concentrically.

The aircraft propulsion system may have PE modules to provide power to the electric motor. The PE modules forming a ring arrangement. The method may pass liquid coolant form the ring intake to the PE modules.

In accordance with another embodiment of the invention, an aircraft propulsion system has an electric motor configured to generate thrust and a (PE) module configured to provide power to the electric motor. The aircraft propulsion system also has a cooling system including a heat extractor. The cooling system is configured to pass a liquid coolant through the PE module, then through the electric motor, and then through the heat extractor.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DETAILED DESCRIPTION

Illustrative embodiments may be an aircraft with a propulsion system configured to remove heat from its heat-generating components, such as electric motors, leads, and power electronics. To that end, such embodiments have a motor electrically coupled to power electronics modules by way of leads. To extract heat from these components, the propulsion system has a cooling system to pass liquid coolant through multiple components. The liquid coolant may be a non-conductive liquid, such as an oil, among other things. To protect the power electronics, the cooling system passes the liquid coolant through the power electronics before passing the liquid coolant through the electric motor after extracting heat from the liquid coolant. The cooling system may flood some of the components or may use a device to cool one of the components, such as a cold plate, among other things.

Figure 1:
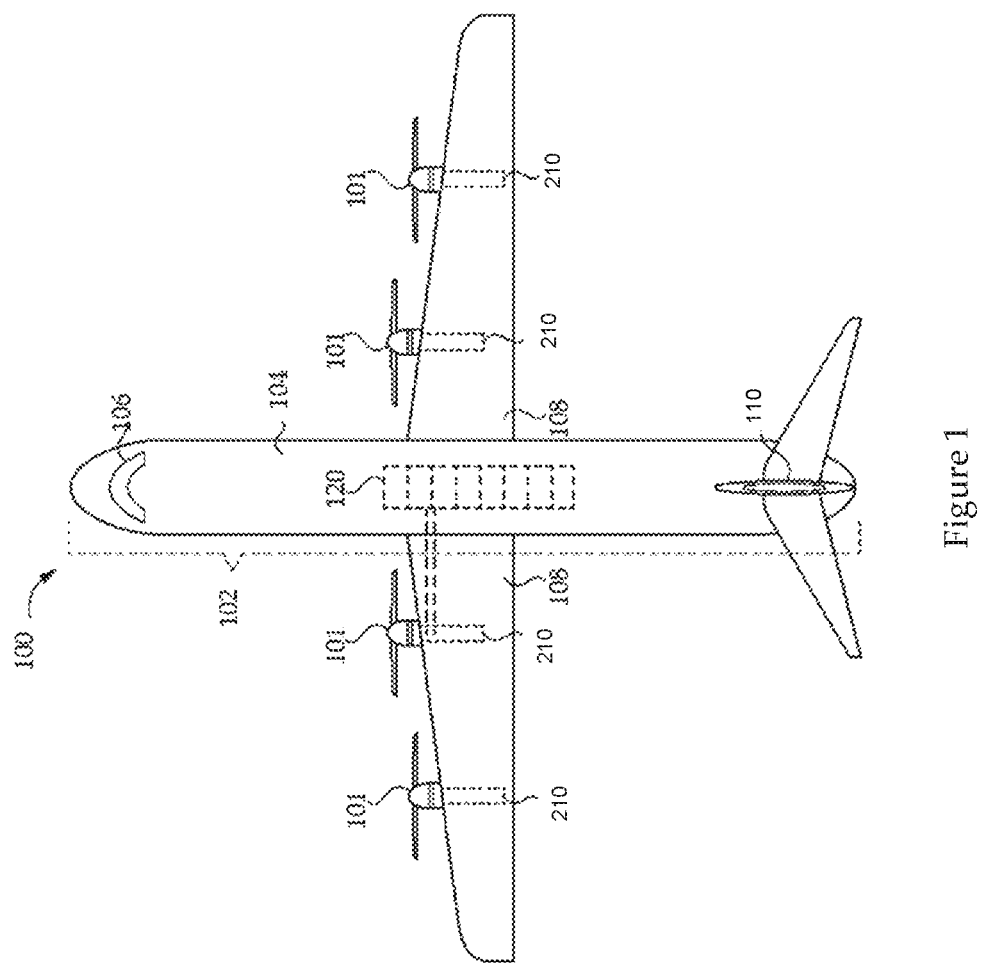
FIG. 1 schematically shows an aircraft in accordance with various embodiments.

FIG. 1 schematically shows an aircraft 100 in accordance with various embodiments. Among other things, the aircraft 100 may be able to carry 90-150 passengers on flights at jet altitudes and speeds over distances of at least 600 miles.

The aircraft 100 may have a fuselage 102, which may house a pressurized passenger area 106 configured to house passengers and provide pressurized air to passengers. The fuselage 102 may further house an unpressurized area 104 for storing cargo. The aircraft 100 may have one or more sets of wings 108 configured to provide suitable lift for flight, takeoff, and landing.

The aircraft 100 may have an energy storage 120 configured to store and provide power to the propulsion systems 101 receive electric power from the energy storage 120 and convert the electric power to thrust. Among other things, the propulsion systems 101 may have a power rating of at least 2 MW. The propulsion systems 101 may be coupled to the wings 108, the tail 110, or the fuselage 102.

Figure 2:
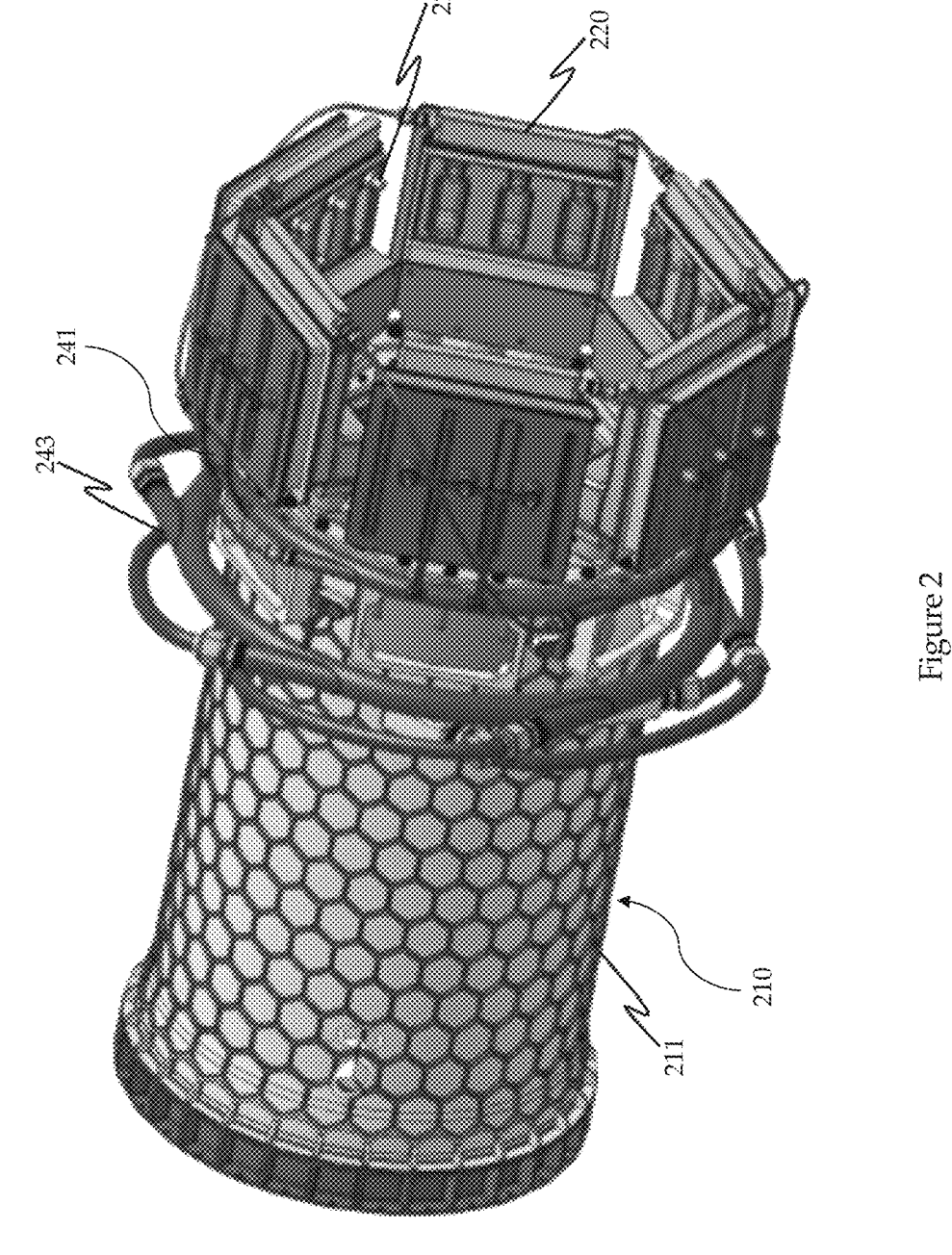
FIG. 2 schematically shows an aircraft propulsion system in accordance with various embodiments.

FIG. 2 schematically shows the aircraft propulsion system 101 in accordance with various embodiments. It should be appreciated the aircraft propulsion system may be arranged differently. For example, the aircraft propulsion system 101 may have more or fewer of a certain component, among other things.

The aircraft propulsion system 101 includes an electric motor 210 configured to receive electric power and rotate a fan, generating thrust. The electric motor 210 may be a permanent magnet-type motor, among other things. As illustrated, the electric motor 210 may include a protection sleeve 211 surrounding the other components of the electric motor 210.

The aircraft propulsion system 101 includes power electronic (PE) modules 220 configured to receive electric power and convert the received power to provide to the electric motor 210. In the illustrated embodiment, the aircraft propulsion system 101 has six power electronic modules 220. The aircraft propulsion system 101 may have another number of power electronic modules, such as one, six, eight, ten, twelve, fourteen, sixteen, eighteen, or twenty, among other things. As illustrated, the PE modules 220 are arranged in a ring configuration and concentric with the driveshaft 213 of the electric motor 210.

The PE modules 220, as illustrated, are coupled to the electric motor 210. In some embodiments, the PE modules 220 are electrically, mechanically, and/or fluidly coupled to the electric motor 210.

The PE modules 220 include a power converter, such as an inverter, to convert the received power to the power required to operate the electric motor 210. For example, the PE module 220 may receive direct current, convert the direct current to alternating current having a voltage and frequency, and output the alternating current to the electric motor 210. The power output by the PE module 220 may be single phase or multiphase power. The aircraft propulsion system 101 may include a controller to control the output voltage and frequency based on a desired speed, torque, or other operating characteristic of the electric motor 210, among other things.

In some embodiments, a portion of the cooling system 140 is incorporated into the PE module 220. For example, the PE module 220 may include an enclosure, such as a housing or a cold plate, to direct the flow of liquid coolant through the PE module. The liquid coolant extracts heat from the power electronics and other components of the PE module. In addition to a power converter, the PE module 220 may have additional components, such as measuring devices or filters, among other things.

The aircraft propulsion system 101 has an AC lead 230 coupled to the output of the power converter of the PE module 220 and coupled to the electric motor 210. For example, the electric motor 210 may have coils arranged in a stator 270 surrounding a rotor 260 and a driveshaft 213. The AC lead 230 is configured to couple the stator coils to the power converter to provide power to the stator coils. The number of AC leads 230 coupled to each PE module 220 may correspond to the number of phases of the output power. Notably, attaching the PE modules 220 to the electric motor 210 enables such a short, closed-loop cooling system, such as the illustrated cooling system 240.

In certain embodiments, the electric motor 210 is an eight-sector motor coupled to eight PE modules 220 (i.e., eight different commutation circuits) having independent phases. For example, the eight independent sectors may operate in parallel and be in the same phase (i.e., the eight independent sectors are not different). Each sector of the eight-sector motor may operate in 3-phase. In some embodiments, a 3-phase motor with eight sectors operating in parallel and in phase can provide a 24-phase power supply when eight y-connections are made across the sectors. Thus, the eight-sector motor can supply a high current output if desired or needed. Further, the eight sectors provide abundant redundancy in the system, particularly desired and required in aviation.

The cooling system 240 is configured to receive heated liquid coolant from the electric motor 210, cool the liquid coolant, and pass the cooled liquid coolant to the PE modules 220. The cooling system 240 may include an intake manifold 241 configured to be coupled to each of the PE modules 220 and pass liquid coolant to each of the PE modules. The coolant system 240 may also include an output manifold 243 configured to receive liquid coolant from the electric motor 210. As in the illustrated example, the output manifold 243 may receive coolant from the electric motor 210 using multiple connection points, such as having a connection point for each section, among other things. The cooling system 240 may include a pump or other device to generate liquid coolant circulation through the propulsion system 101. For example, the pump may be coupled between the intake manifold 241 and the output manifold 243.

The cooling system 240 also has a heat extractor to extract heat from the liquid coolant to remove heat from the propulsion system 101. The heat extractor may be a heat exchanger or chiller, among other things.

As illustrated, the intake manifold 241 or the output manifold 243 may be arranged as a complete or partial ring and/or concentrically relative to each other, the axis of rotation of the electric motor 210, or the ring arrangement of the PE modules 220.

FIG. 2 shows a schematic cross-section of the PE module 220A, a portion of the electric motor 210, and the PE module 220B shown from the side (including the DC bus connections 227). The PE module 220A may be connected to the electric motor 210 via bus bars 320 connecting from the AC leads 230 extending from the PE module 220A. Connecting the PE modules 220 to the electric motor 210 provides for a relatively short AC bus connection from the PE modules 220 to the electric motor 210. As noted above, the electric motor 210 may be made up of multiple sectors operating independently and in parallel to provide power to the electric motor 210. Also, each sector may include a branch coupled to the output manifold 243 and receive liquid coolant from one branch of the intake manifold 241.

The path of the liquid coolant is a tortuous path as highlighted by the arrows A, B, C, and D of FIG. 2. The liquid coolant (e.g., an oil, an emulsification, and/or any thermally conductive and electrically insulative liquid medium) flows through the intake manifold 241 into the PE module 220. Hereinafter, "oil" may be used as shorthand for the liquid coolant, however it should be noted that the liquid coolant need not be an oil, but any thermally conductive and electrically insulative liquid medium as noted. The PE module 220 may be flooded with the oil indicated as path B. The oil flooded into the PE module 220 cools the electronic components 224. As such, the oil directly contacts most or all electronic components 224 within the PE module 220. When in direct contact with the electronic components 224, the oil may extract heat from the electronic components 224, cooling the electronic components 224, and overall, the PE module 220.

The oil then flows from the PE module 220 into the electric motor 210 via the AC leads 230 (path C), cooling the bus bars 320. The oil can then cool the motor coils 250, motor rotor 260, and the motor stator 270 at path D as the oil flows through a motor-cooling volume 280 and enters the output manifold 243. The oil may continue to flow through the liquid into the intake manifold 241 and repeat the cycle.

In certain preferred embodiments, the closed-loop cooling system 240 may extract heat from (i.e., cool) the electric motor 210 and the PE modules 220 in a single flow cycle. Integrating the cooling of the PE modules 220 and the electric motor 210 provides for an efficient and low-maintenance aircraft electric motor 210 and/or aircraft engine cooling system. Additionally, employing a thermally conductive and electrically insulative liquid medium allows the oil (e.g., the liquid coolant) to directly contact the electronic components 224. Since the oil is electrically insulative (e.g., non-conductive), the oil can contact the various transistors, resistors, capacitors, and the like, and immediately extract any heat generated by the electronic components 224. Accordingly, illustrative embodiments describe a liquid cooling system 240 that is extraordinarily more efficient than an air-cooled system.

Interestingly, the cooling order (e.g., the flow direction) assists with the health and function of the electric motor 210. As known in the art, the electric motor 210 during operation achieves a temperature that is greater than the temperature achieved by active electronics. In some examples, a PM motor, even a PM motor considered to be highly efficient, can reach operating temperatures close to 200° C. (e.g., up to 200° C., up to 190° C., up to 180° C., up to 170° C., up to 160° C., or up to 150° C.). Likewise, active electronics typically achieve operating temperatures above 150° C. (e.g., up to 150° C., up to 140° C., up to 130° C., up to 120° C., or up to 110° C.). Thus, in a closed-loop cooling system as illustrated, the inventors recognized the desirability of cooling the PE modules 220 before cooling the electric motor 210. The oil (e.g., liquid coolant) will absorb heat from parts being cooled, elevating the temperature of the oil. The oil will then carry the extracted heat as it travels through the propulsion system 101. Flowing the oil through the lower operating temperature of the electronic components 224 allows for a cooler temperature oil to flow into the electric motor 210 operating at a higher temperature. Conversely, flowing the oil through the higher operating temperature of the electric motor 210 first will carry excessive and possibly detrimental heat into the electronic components 224. Electronics' sensitivity to heat is well known in the art, excessive heat may damage electronic components, thus it is preferred that operating electronics are maintained at safe temperatures. Moreover, an electric motor is much less sensitive to heat than electronics are. Accordingly, flowing the oil through the PE modules 220, and more notably the electronic components 224 within the PE modules 220, and then through the electric motor 210 facilitates safe operation. As such, flowing the oil through the PE modules 220 first carries a lower risk to the electric motor 210 than if the flow of the oil were reversed. The oil exiting the PE modules 220 typically does not carry sufficient heat to damage the electric motor 210. Instead, the oil exiting the PE modules 220 remains at a temperature sufficient to extract heat from the electric motor 210, thus protecting the PE modules 220 and the electric motor 210. Additionally, the closed-loop liquid cooling system 240 may include additional heat extractors configured to extract heat from the liquid coolant.

Figure 3:
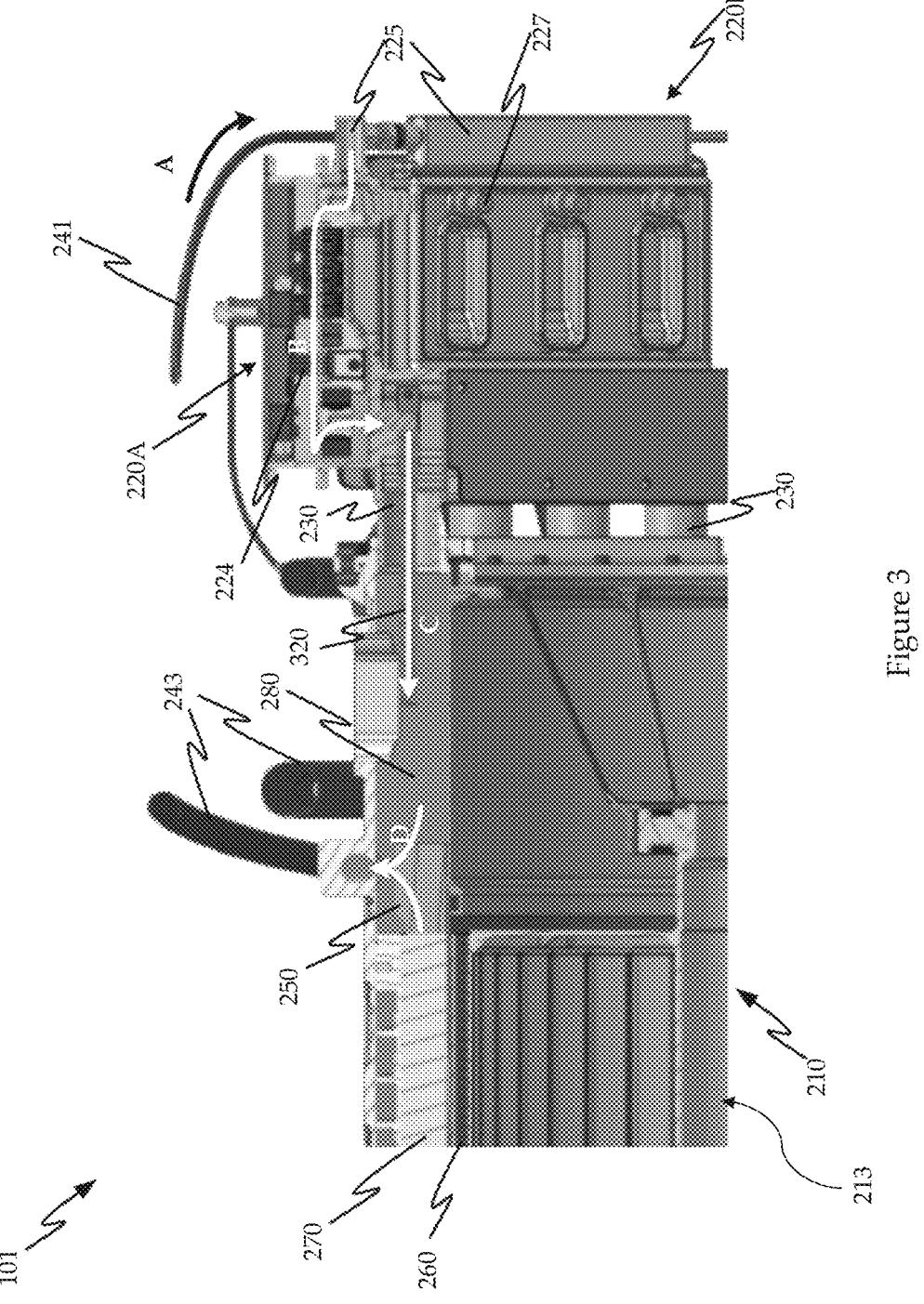
FIG. 3 schematically shows a cross-sectional view of the aircraft propulsion system in accordance with various embodiments.
Figures 4A, 4B, 4C:
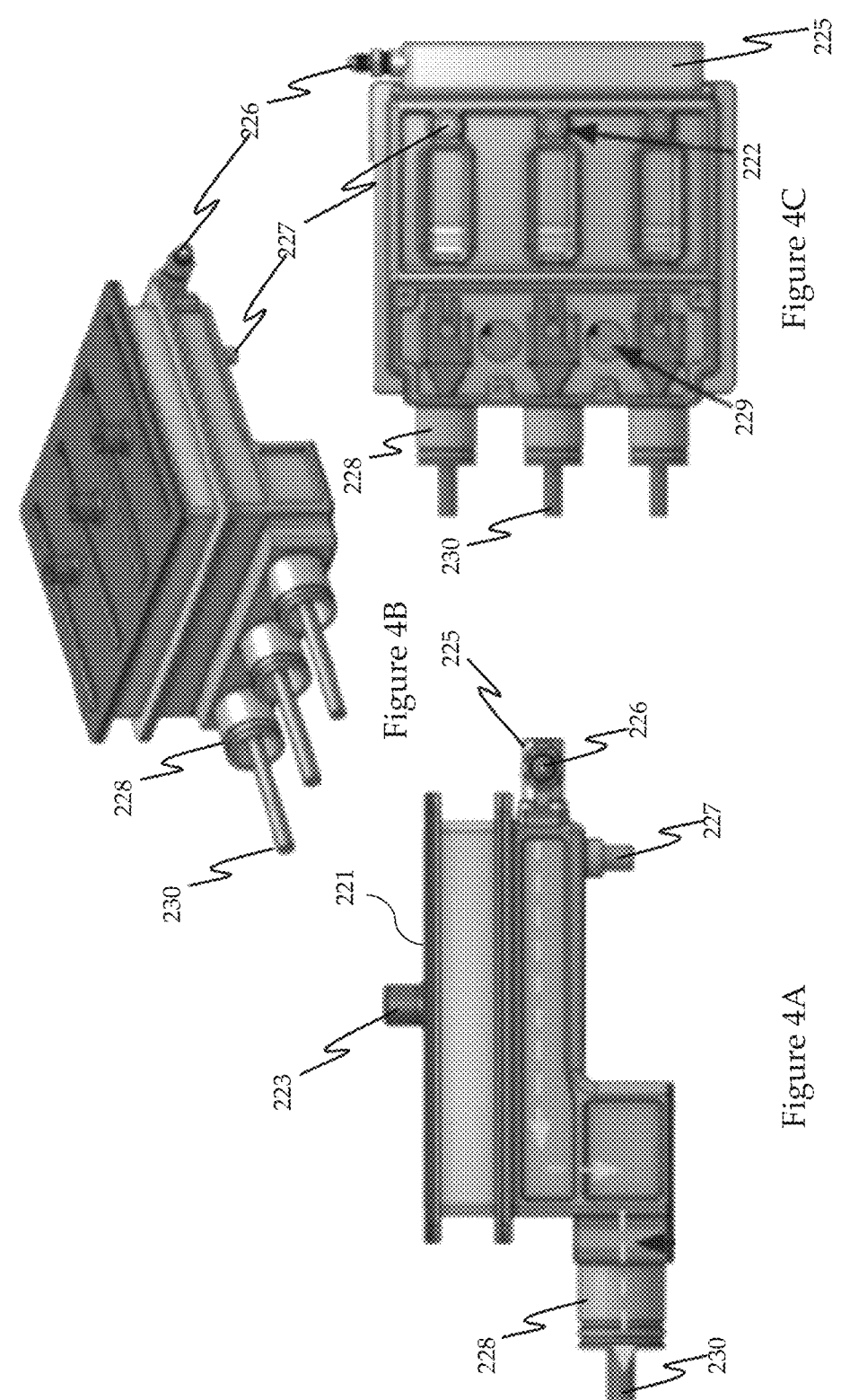
FIGS. 4A-C schematically show views of power electronic module in accordance with various embodiments.

FIGS. 4A-4C schematically show different views of the PE module 220. FIG. 4A is a side-view of the PE module 220 showing the liquid coolant path through the inverter via light grey dashed lines/arrows. The liquid coolant (e.g., oil) enters through an oil inlet 226 into the PE module 220. The AC lead 230 is protected by a cooling channel, also known as an output port 228, acting as a sheath which allows the oil to cool the AC power lead 310 and exit to the electric motor 210 (see FIG. 3). Also shown in FIG. 4A is a mounting post 223 that supports the intake manifold 241

FIG. 4B shows a perspective view of the PE module 220, providing perspective of the form of the PE module 220. FIG. 4C is a bottom view of the PE module 220 showing, among other things the DC bus connections 227. The center connection 222 may be a neutral connection for testing. FIG. 4B also shows oil ports 229 configured to feed or remove oil from the PE module 220.

In certain embodiments, the oil flow through the PE module 220 floods the module. As noted above, the liquid coolant is non-conductive, thus the liquid coolant can directly contact the electronic components 224, such as an inverter, to extract heat without causing a short-circuit. In other words, since the liquid coolant is non-conductive, there should be no cross-talk among the electronics in the PE module 220. Direct contact may allow the liquid coolant to extract heat from (i.e., cool) the electronic components 224 faster and more efficiently than air cooling, heat sinks, and/or indirect liquid cooling.

In some embodiments, the flow rate of the liquid coolant should be optimized to the particular system being cooled. For example, the cooling system for an aircraft PM motor may employ a flow rate of about 1 kilogram per second (kg/s) of liquid coolant through the closed-loop liquid coolant line (e.g., the oil flow rate through the inverters and motor is about 1 kg/s). In certain examples, the oil flow rate can range from about 0.1 kg/s to about 10 kg/s (e.g., from about 0.5 kg/s to about 5 kg/s, from about 0.25 kg/s to about 2.5 kg/s, from about 0.33 kg/s to about 3 kg/s, from about 0.66 kg/s to about 2.3 kg/s, or from about 0.75 kg/s to about 1.25 kg/s).

In some embodiments, the liquid coolant temperature rise resulting from extracting heat from the PM motor is less than 20° C. For example, the liquid coolant temperature rise (e.g., oil temperature rise) should be less than 20° C., less than 19° C., less than 18° C., less than 17° C., less than 16° C., less than 15° C., less than 14° C., less than 13° C., less than 12° C., less than 11° C., less than 10° C., less than 9° C., less than 8° C., less than 7° C., less than 6° C., or less than 5° C.

In other embodiments, the oil temperature rise may be correlated to the oil flow rate. For example, where an inverter has an operating temperature of about 130° C., and a motor has an operating temperature of 180° C., employing a 1 kg/s oil flow rate will provide an oil temperature rise of less than 20° C. as the oil flows through the closed-loop liquid coolant line.

In other embodiments, physically connecting (e.g., attaching, including bolting) the PE modules 220 to the electric motor 210 allows the bus bars to create electrical connections instead of cables typically used in aviation. Bus bars provide a more reliable connection with a possibly reduced resistance in the connection.

In another embodiment of the invention, the PM motor cooling system 240 may be implemented on a new manufacture aircraft or as an add-on component for an aircraft with the electric motor 210.

Figure 5:
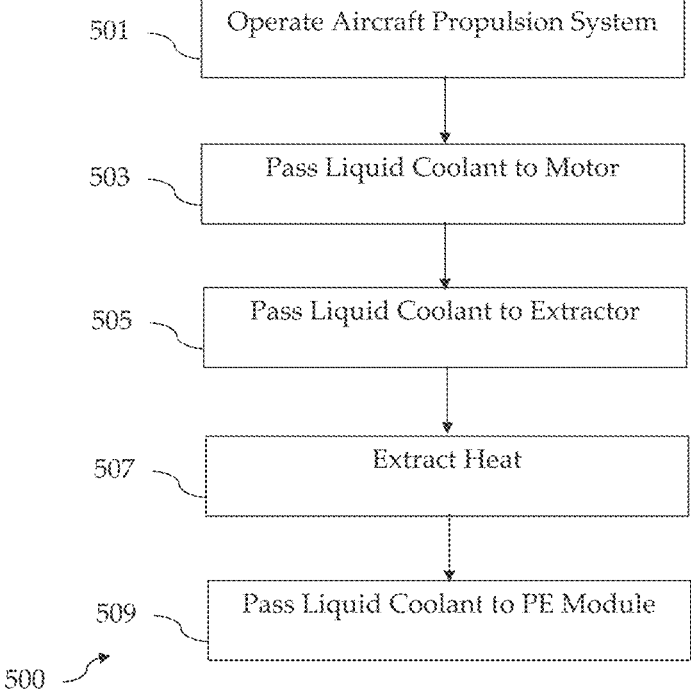
FIG. 5 is a flowchart showing a process for cooling an aircraft propulsion system.

FIG. 5 shows an exemplary Process 500 for cooling an aircraft propulsion system 101. The Process 500 may be implemented in whole or in part by one or more of the aircraft propulsion systems 101 disclosed herein. It should be appreciated that a number of variations and modifications to the Process 500 are contemplated including, for example, the omission of one or more aspects of the Process 500, the addition of further conditionals and operations, or the reorganization or separation of operations and conditionals into separate processes.

The Process 500 begins, in operation 501, with operating the aircraft propulsion system 101 including the electric motor 210, the PE module 220, the AC lead 230, and the cooling system 240. The electric motor 210 is fluidly coupled to the heat extractor of the cooling system 240, as well as the PE module 220.

As the cooling system 240, in operation 503, pumps the liquid coolant through the propulsion system 101, the liquid coolant passes from the PE module 220 to the electric motor 210. The liquid coolant passes by way of a coolant channel, such as the output port 228 where the AC lead 230 is positioned and electrically coupled between the PE module 220 and the electric motor 210. The liquid coolant may flood one or more enclosures of the electric motor 210 in order to extract heat from the electric motor 210.

Process 500 then proceeds to operation 505, where the liquid coolant passes from the electric motor 210 to the heat extractor. The extractor then, in operation 507, extracts the heat from the liquid coolant effectively cooling the liquid coolant and removing heat from the propulsion system 101. In some embodiments, the liquid coolant passes through an output manifold 243 between the electric motor 210 and the heat exchanger in order for the liquid coolant passing through different sections of the electrical motor 210 to be aggregated.

After cooling the liquid coolant, the Process 500 proceeds to operation 509, where the cooled liquid coolant passes from the heat extractor to the PE module 220. The PE module 220 may receive the liquid coolant in an enclosure, such as the housing 221 of the PE module 220 where the PE module 220 is cooled by flooding, or such as a cold plate, where the heat generating components of the PE module 220 are cooled by the cold plate. The liquid coolant may continue to circulate as described in operations 503-509 repeatedly to maintain a safe temperature within the propulsion system.

It is contemplated that the various aspects, features, processes, and operations from the various embodiments may be used in any of the other embodiments unless expressly stated to the contrary. Certain operations illustrated may be implemented by a computer executing a computer program product on a non-transient, computer-readable storage medium, where the computer program product includes instructions causing the computer to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described, and that all changes and modifications that come within the spirit of the present disclosure are desired to be protected. It should be understood that while the use of words such as "preferable," "preferably," "preferred" or "more preferred" utilized in the description above indicate that the feature so described may be more desirable, it nonetheless may not be necessary, and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with, or a connection to, another item, as well as a belonging to, or a connection with, the other item as informed by the context in which it is used. The terms "coupled to," "coupled with" and the like include indirect connection and coupling, and further include but do not require a direct coupling or connection unless expressly indicated to the contrary. When the language "at least a portion" or "a portion" is used, the item can include a portion or the entire item unless specifically stated to the contrary. Unless stated explicitly to the contrary, the terms "or" and "and/or" in a list of two or more list items may connote an individual list item, or a combination of list items. Unless stated explicitly to the contrary, the transitional term "having" is open-ended terminology, bearing the same meaning as the transitional term "comprising."

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-alone hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. Such variations and modifications are intended to be within the scope of the present invention as defined by any of the appended claims. It shall nevertheless be understood that no limitation of the scope of the present disclosure is hereby created, and that the present disclosure includes and protects such alterations, modifications, and further applications of the exemplary embodiments as would occur to one skilled in the art with the benefit of the present disclosure.

What is claimed is:

1. A motor cooling system, comprising:
a permanent magnet electric motor;
a power electronic (PE) module configured to provide power to the electric motor including an output port configured to fluidly couple the electric motor and the PE module;
an alternating current (AC) lead configured to electrically couple the PE module and the electric motor; and
a cooling sub-system having a heat extractor, the cooling sub-system being configured to pass a liquid coolant sequentially through a) the PE module, b) the output port, c) the electric motor, and then through d) heat extractor,
the PE module, the output port, and the electric motor collectively defining a single, shared flooded cooling volume.

2. The motor cooling system of claim 1 wherein the PE module comprise a power converter.

3. The motor cooling system of claim 2 wherein the power converter comprises an inverter.

4. The motor cooling system of claim 1 wherein the AC lead extends through the output port.

5. The motor cooling system of claim 1, wherein the PE module is mechanically coupled to the electric motor.

6. The motor cooling system of claim 1, wherein the PE module comprises one or more electronic components, further including a cold plate thermally coupled to the AC lead, the one or more electronic components of the PE module, or both the AC lead and the one or more electronic components of the PE module.

7. The motor cooling system of claim 1, comprising:
a plurality of PE modules forming a PE ring arrangement;
an intake manifold configured to be coupled to a coolant input port of each of the plurality of PE modules; and
an output manifold coupled to the electric motor,
the PE ring arrangement, the intake manifold, and the output manifold arranged substantially concentrically.

8. The motor cooling system of claim 7, wherein the cooling system includes a plurality of parallel cooling paths between the electric motor and the intake manifold formed by the plurality of PE modules.

9. A motor cooling system, comprising:
a permanent magnet electric motor;
at least one inverter configured to convert a DC signal to an AC signal, the at least one inverter being external to the motor;
a closed-loop liquid coolant line configured to contain a liquid coolant, the closed-loop liquid coolant line comprises a first portion configured to extract heat from the at least one inverter, and a second portion configured to extract heat from the motor,
the first and second portions being positioned and configured so the liquid coolant passes through the first portion before passing through the second portion,
wherein the at least one inverter, the permanent magnet motor, and the closed-loop liquid coolant line collectively define a single, shared flooded cooling volume configured to receive the liquid coolant during operation.

10. The motor cooling system of claim 9 further comprising an AC lead configured to electrically couple the at least one inverter and the electric motor, the AC lead extending through the output port.

11. The motor cooling system of claim 9, wherein the inverter is mechanically coupled to the electric motor.

12. The motor cooling system of claim 9, wherein the inverter comprises one or more electronic components, the system further including a cold plate thermally coupled to the one or more electronic components of the inverter.

13. The motor cooling system of claim 9, comprising:
a plurality of inverters forming an inverter ring arrangement;
an intake manifold configured to be coupled to a coolant input port of each of the plurality of inverters; and
an output manifold coupled to the electric motor,
the inverter ring arrangement, the intake manifold, and the output manifold arranged substantially concentrically.

14. The motor cooling system of claim 13, wherein the cooling system includes a plurality of parallel cooling paths between the electric motor and the intake manifold, the plurality of parallel cooling paths being formed by the plurality of inverters.

15. A machine cooling system, comprising:
a heat generating electric machine configured for electromagnetic energy conversion;
power conversion circuitry configured to convert electrical power between AC and DC, the power conversion circuitry being external to the heat generating machine;

a closed-loop liquid coolant line configured to contain a liquid coolant, the closed-loop liquid coolant line comprising a first portion configured to extract heat from the power conversion circuitry, and a second portion configured to extract heat from the heat generating machine, the first and second portions being positioned and configured so the liquid coolant passes through the first portion before passing through the second portion, wherein the power conversion circuitry, the heat generating machine, and the closed-loop liquid coolant line collectively define a flooded cooling environment configured to receive the liquid coolant during operation.

16. The machine cooling system of claim 15, wherein the power conversion circuitry is configured to operate in an AC-to-DC power conversion mode during at least one operating condition.

17. The machine cooling system of claim 15, wherein the heat generating electric machine comprises a generator.

18. The machine cooling system of claim 15 wherein the heat generating electric machine comprises a motor.

19. The machine cooling system of claim 15 wherein the power conversion circuitry comprises an inverter.

20. The machine cooling system of claim 15, wherein the power conversion circuitry comprises one or more electronic components, the system further including a cold plate thermally coupled to the one or more electronic components of the power conversion circuitry.

* * * * *